United States Patent [19]

Lugo et al.

[11] Patent Number: 5,265,980
[45] Date of Patent: Nov. 30, 1993

[54] JUNCTION PLATE ASSEMBLY FOR A SUBSEA STRUCTURE

[75] Inventors: Mario R. Lugo, Houston; Jon D. Buck, Angleton; Mike Cunningham, Plantersville, all of Tex.

[73] Assignee: Oil Industry Engineering, Inc., Tomball, Tex.

[21] Appl. No.: 952,694

[22] Filed: Sep. 28, 1992

[51] Int. Cl.5 .............................................. F16L 1/12
[52] U.S. Cl. ................................... 405/169; 166/347; 405/158
[58] Field of Search ....................... 405/158, 169, 170; 166/338, 341, 343, 344, 347

[56] References Cited

U.S. PATENT DOCUMENTS

| | | | |
|---|---|---|---|
| 4,648,629 | 3/1987 | Baugh | 405/169 X |
| 4,676,696 | 6/1987 | Laursen | 405/169 |
| 4,695,189 | 9/1987 | Wallace | 405/169 |

Primary Examiner—David H. Corbin
Attorney, Agent, or Firm—Harrison & Egbert

[57] ABSTRACT

A junction plate assembly for a subsea structure having a first junction plate with a plurality of control connections contained therein, a second junction plate with a second plurality of control connections contained therein, and a connector extending generally centrally of the first junction plate for engaging a receptacle of the second junction plate. The first junction plate has an umbilical cable connected to the control connections. The connector is a shaft which extends through the first junction plate and has one end extending into the receptacle of the second junction plate. The end of the shaft has an external acme thread in mating engagement with an internal acme thread of the receptacle. A handle is connected to an opposite end of the shaft for rotating the shaft. The control connections may be either hydraulic or electrical connections.

17 Claims, 6 Drawing Sheets

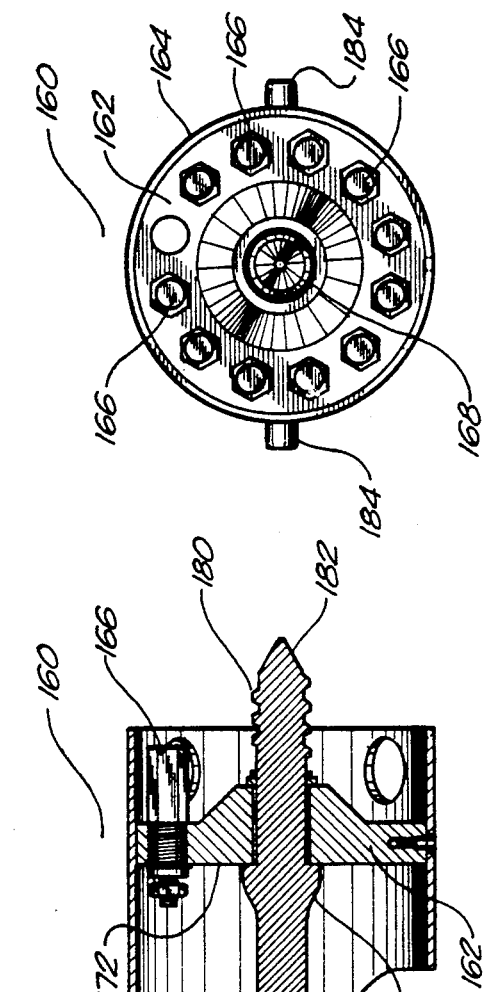
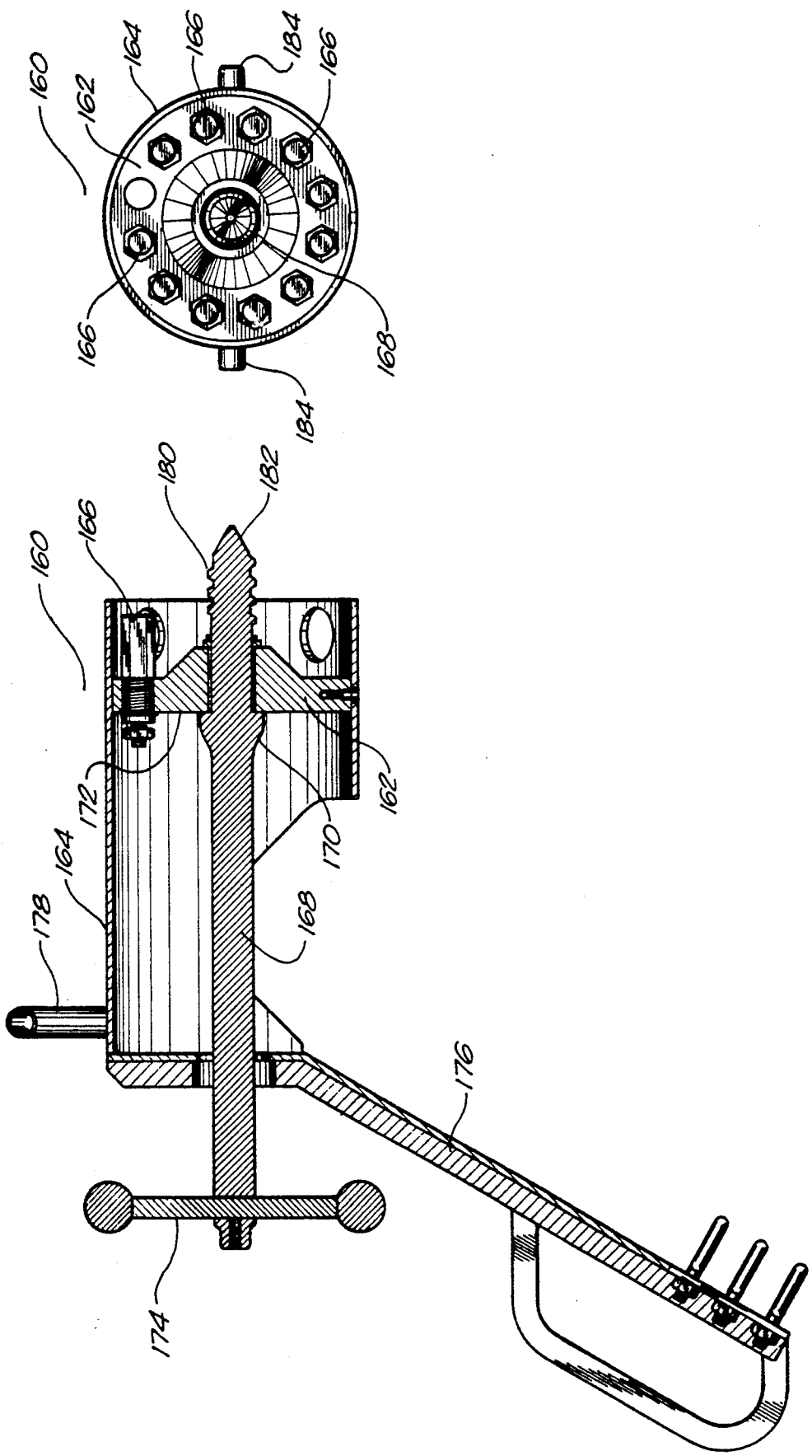

JUNCTION PLATE ASSEMBLY FOR A SUBSEA STRUCTURE

TECHNICAL FIELD

The present invention relates to devices for subsea trees, manifolds, control modules, or other structures. More particularly, the present invention relates to junction plates for the connection of hydraulic or electrical lines to subsea trees and any other structures that require subsea controls.

BACKGROUND ART

In conventional oil and gas production processes, it is common to install a subsea tree structure on a well. The subsea tree structure is a piece of oilfield equipment which is in seated relationship to the well The tree structure will have a large number of valves and controls thereon so as to suitably facilitate the removal of oil and/or gas from the well. The installation of the subsea tree or other structures can be either diverless or diver assist. Once the subsea tree structure is installed, it must be connected for remote actuation so that proper controls can be maintained over the operation of the tree structure for the production of oil or gas from the well.

In conventional operations, an umbilical cable is interconnected to a fixed junction plate on the subsea tree structure. The umbilical cable extends from the tree structure to a production control skid mounted on an offshore platform or elsewhere above sea level. Typically, the subsea tree structure will include a large number of hydraulically-actuated valves. The umbilical cable is designed so as to allow for the delivery of hydraulic and/or electrical power to the subsea structure so that the fluids can properly operate the valves within the subsea tree structure. In normal operations, the umbilical cable is laid in the vicinity of a subsea structure by a barge or other device. The diver will then join the umbilical cable to the fixed junction plate on the subsea structure. In the case of a diverless connection, an R.O.V. or running tools are used to make this connection. Typically, the umbilical cable will extend for a great distance from the subsea structure or the manifold structure.

Presently, a junction plate is used so as to join the umbilical cable to the fixed junction plate of the subsea structure. Usually, the joining of these plates together is a cumbersome and time-consuming task for divers. It is essential to the operation of the subsea structure that the junction plates be joined properly. Therefore, in order to assure a proper joining of the junction plates, various complex devices have been employed, in the past, so as to assure a proper fit between the connections of the subsea structure and the connections within the junction plate.

Commonly, swing bolts are used so as to join the plates together. Swing bolts extend down over the plates and require a mechanical joining of the plates together. However, it is inherent in the nature of swing bolts that a deflection is created between the junction plate and the subsea tree structure. Whenever a deflection between the plates occurs, the poppet valves within the junction plates and within the subsea tree structure will tend to close. Poppets are arranged so as to close upon separation of the removable or fixed junction plates. Quick connect junction plates that require an over-center technique for locking must be precisely used so as to avoid such separation and such poppet closure.

Additionally, devices that have employed bolts and threaded members for the joining of the junction plates have been subject to the problem of galling. This problem of galling is particularly troublesome when stainless steel is used for the locking mechanism. Whenever the bolts are placed onto threaded members, a galling action has a tendency to occur. This is especially pronounced when the threaded members have conventional threads. Often, the threads are damaged during the installation process. This requires further efforts to correct the problem. These efforts can be very complex since they must proceed under water.

In existing diver-assist systems, it is necessary for the diver to carry a number of tools so as to properly install the junction plates together. Whether a swing bolt is used or nuts and bolts are used, the diver typically requires a wrench. This creates a complicated process of installation since the diver must secure the junction plate with one hand while attempting to manipulate the nuts and bolts with a wrench. Since the removable junction plate is a heavy item, this can be a particularly difficult task for the diver.

Another common problem t hat has been faced with prior art systems of joining the junction plates together has been the potentially damaging effects of exposing the sensitive hydraulic connections to the floor of the body of water. Many times, dirt, rocks, and other contaminants will enter into the hydraulic connections. It is often necessary for divers to remove any such particulate contamination from the hydraulic and/or electrical connections prior to installing the junction plate to the subsea structure. Instances have occurred in the past in which particulate matter has fouled the operation of the subsea structure. It is therefore very important that the hydraulic connections within the junction plates be kept free of contaminating material.

It is an object of the present invention to provide a junction plate assembly that assures a proper connection.

It is another object of the present invention to provide a junction plate assembly which is diver/ROV friendly.

It is a further object of the present invention to provide a junction plate assembly which minimizes risk of damage during installation.

It is still a further object of the present invention to provide a junction plate assembly that generally prevents particle intrusion into the connections of the junction plates.

These and other objects and advantages of the present invention will become apparent from a reading of the attached specification and appended claims.

SUMMARY OF THE INVENTION

The present invention is a junction plate assembly for a subsea structure that comprises a first junction plate having a first plurality of control connections contained therein and an umbilical cable connected to the control connections, a second junction plate with a second plurality of control connections contained therein, and a connector connected to and extending generally centrally of the first junction plate. The connector engages a receptacle of the second junction plate so as to join the first and second junction plates together. The second junction plate includes means for affixing to a subsea structure. Typically, the first junction plate is a removable plate and the second junction plate is a fixed junction plate. The control connections may be either hydraulic lines and/or electrical lines.

The connector is a shaft extending through the removable junction plate. The shaft has one end extending into the receptacle of the fixed junction plate. The shaft has another end extending outwardly of the first junction plate. One end of the shaft has an external acme thread formed thereon. The receptacle has an internal acme thread. The external acme thread of the shaft is in mating engagement with the internal acme thread of the receptacle. The other end of the shaft has a handle connected thereto. The handle is rotatable so as to rotate the shaft such that the threads may properly engage each other. The handle is releasably slidably received by the shaft so that it can be selectively moved into an eccentric position with respect to the shaft.

The removable junction plate includes a housing having a generally cylindrical configuration and a first gripper member which is connected to the housing and extends outwardly therefrom. The connector extends longitudinally within the housing. A second gripper member is connected to a side of the housing opposite the first gripper member.

The fixed junction plate includes a frame which defines an opening. The frame has a generally cylindrical configuration. The opening receives the housing of the first junction plate therein. The frame has a funnel edge extending outwardly from the opening. This funnel edge extends around the exterior of the housing when the removable junction plate is joined to the fixed junction plate. The housing of the removable junction plate has at least one key affixed along the exterior surface of the housing. The frame of the fixed junction plate has at least one keyway formed therein. A key of the housing is in sliding engagement with a keyway of the frame.

The junction plate assembly of the present invention is connected to a weak link assembly. Specifically, the umbilical cable of the first junction plate is in hydraulic communication with the weak link assembly. The weak link assembly is hydraulically connected to this umbilical cable and to a hydraulic controller. The weak link assembly has a flange barrel formed therein. This flange barrel has a second receptacle suitable for receipt of the external acme thread of the connector so as to contain the junction plate therein.

BRIEF DESCRIPTION OF THE DRAWINGS

FIG. 4 is a cross-section view, in side elevation, of the diver-assist removable junction plate of the present invention.

FIG. 5 is an end view of the removable junction plate of the present invention.

DETAILED DESCRIPTION OF THE INVENTION

Figure 1:
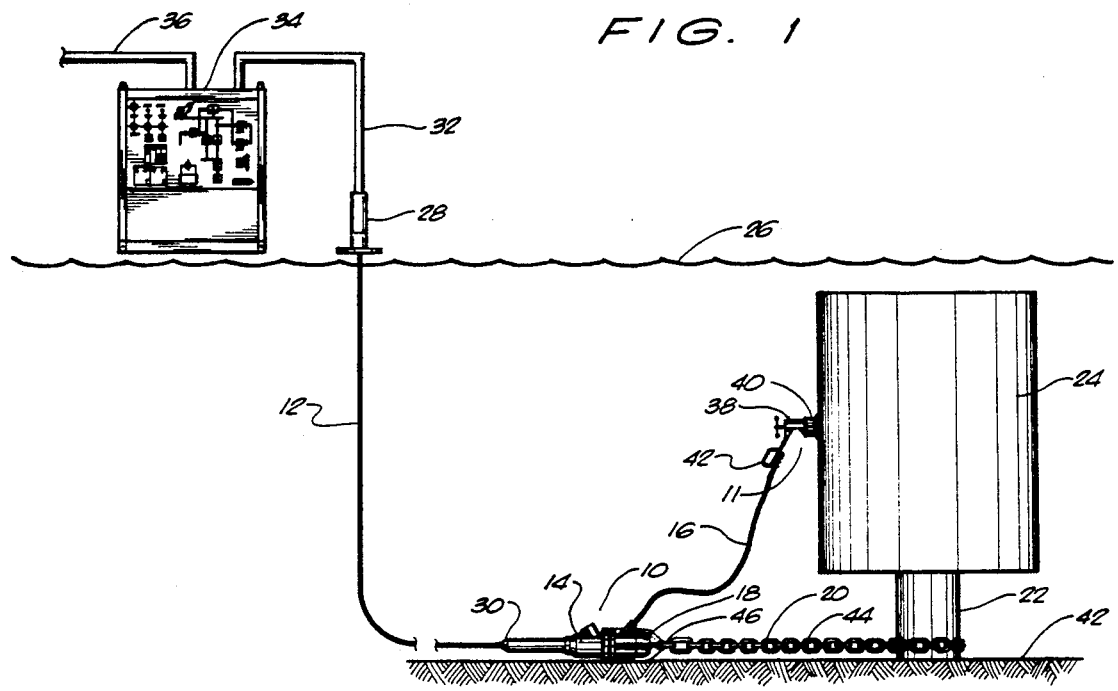
FIG. 1 is a diagrammatic view of the overall arrangement of a diver-assist junction plate assembly of the present invention as used in connection with a production control unit and a subsea tree structure.

Referring to FIG. 1, there is shown at 10 the weak link assembly as utilized in conjunction with the junction plate assembly of the present invention. As illustrated in FIG. 1, the weak link assembly 10 is shown as having a first umbilical cable 12 extending from a first plate 14. The weak link assembly 10 also has a second umbilical cable 16 extending from a second plate 18. A suitable anchoring member 20 extends from the second plate 18 and is joined to the conductor 22 of the subsea structure 24.

In FIG. 1, it can be seen that the weak link assembly 10 is positioned below the level of water 26. As such, the first umbilical cable 12 extends downwardly from the hydraulic junction box 28 located above the water 26. The first umbilical cable 12 extends for a great distance downwardly and outwardly from the hydraulic junction box 28 so as to be suitably joined to the armor termination 30 of the weak link assembly 10. The hydraulic junction box 28 is connected by stainless steel tubing 32 to the production control skid 34. Various connections 36 extend outwardly from the production control skid 34. The production control skid 34 is designed for sending suitable control signals through the first umbilical cable 12 to the weak link assembly 10 and into the second umbilical cable 16. In particular, the production controller 34 will send signals for the purpose of actuating the valves on the subsea structure 24 so as to facilitate or to control the production of oil and gas from the well to which the subsea structure 24 is connected.

The second umbilical cable 16 has a removable junction plate 38 at an end of the cable 16 opposite the weak link assembly 10. The removable junction plate 38 is connected to a fixed junction plate 40 of the subsea structure 24. A handle 42 may be provided on the removable junction plate 38 so as to facilitate the connection of the removable junction plate 38 to the fixed junction plate 40.

In normal operation, the weak link assembly 10 will rest on the floor 42 of body of water 26. The anchoring member 20 is a chain 44 that is connected at one end to the anchor bull nose 46 of the weak link assembly 10. The other end of the chain 44 is attached to the conductor 22 of the structure 24. As such, the anchoring member 20 serves to position the weak link assembly 10 in a desired position relative to the subsea structure 24. In this position, the second umbilical cable 16 will be generally slack between the fixed junction plate 40 and the weak link assembly 10.

With reference to FIG. 1, when any forces are applied to the first umbilical cable 12, then the anchoring member 20 will tend to resist the movement of the weak link assembly 10 with respect to the movement of the first umbilical cable 12. As such, the second umbilical cable 16 will remain slack until the anchoring member 20 breaks away from the conductor 22 of the subsea structure 24. However, by the use of the weak link assembly 10, the weak link assembly 10 will pull apart before the anchoring member 22 breaks. As such, the second umbilical cable 16 will always remain in its slack condition regardless of the forces that are applied to the first umbilical cable 12.

Figure 2:
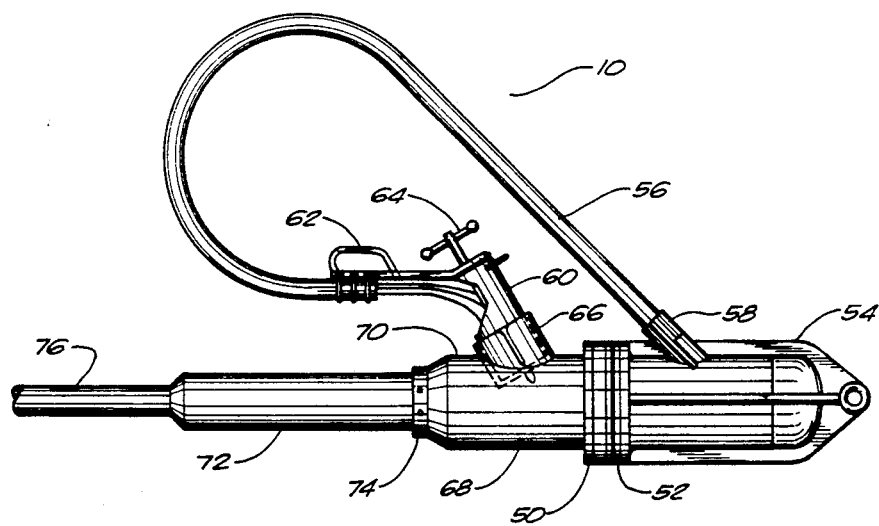
FIG. 2 is a side elevational view of the weak link assembly as used for connection to the diver-assist removable junction plate of the present invention.

FIG. 2 illustrates the weak link assembly 10 in closer detail. It can be seen that the weak link assembly 10 has a first plate 50 and a second plate 52. The weak link member will be contained interior of the plates 50 and 52. An anchor bull nose 54 is fastened at one end to the second plate 52. The anchor bull nose 54 extends outwardly from the plate 52 so as to suitably receive an end of the chain, in a fashion shown as in FIG. 1.

The interior of plates 50 and 52 includes a plurality of control connections. These control connections can be either hydraulic or electrical connections. The second umbilical cable 56 extends outwardly from connector 58. The connections within plates 50 and 52 will extend through connector 58 and into the second umbilical cable 56. The second umbilical cable 56 is flexible and extends around to the removable junction plate 60 of the present invention (to be described hereinafter). Removable junction plate 60 includes a handle 62 at one end. A rotatable handle 64 is provided so as to properly secure the removable junction plate 60 within the flange barrel 66. Flange barrel 66 has a removable J-plate saddle therein so as to receive the removable junction plate 60 and to keep the end of the removable junction plate 60 clean of contaminants from the floor 42 of the body of water 26.

In the configuration shown in FIG. 2, the weak link assembly 10 can be placed on the bottom 42 of a body of water 26 in a suitable condition for installation onto the subsea structure 24. By placing the removable junction plate 60 within the flange barrel 66, the removable junction plate 60 is maintained in a proper position for delivery to the bottom 42 of water 26. By rotating the handle 64, the removable junction plate 60 can be removed from the flange barrel 66 and moved, by a diver, so as to be installed onto the fixed junction plate 40 of the subsea structure 24.

In FIG. 2, the first plate 50 is placed into close juxtaposition to the second plate 52. A housing 68 extends outwardly from the first plate 50 opposite to the second plate 52. The flange barrel 66 extends outwardly from the surface 70 of housing 68. Housing 68 will have the control connections extending therein. Housing 68 has the armor termination 72 connected at end 74. The first umbilical cable 76 is received by the armor termination 72.

Figure 3:
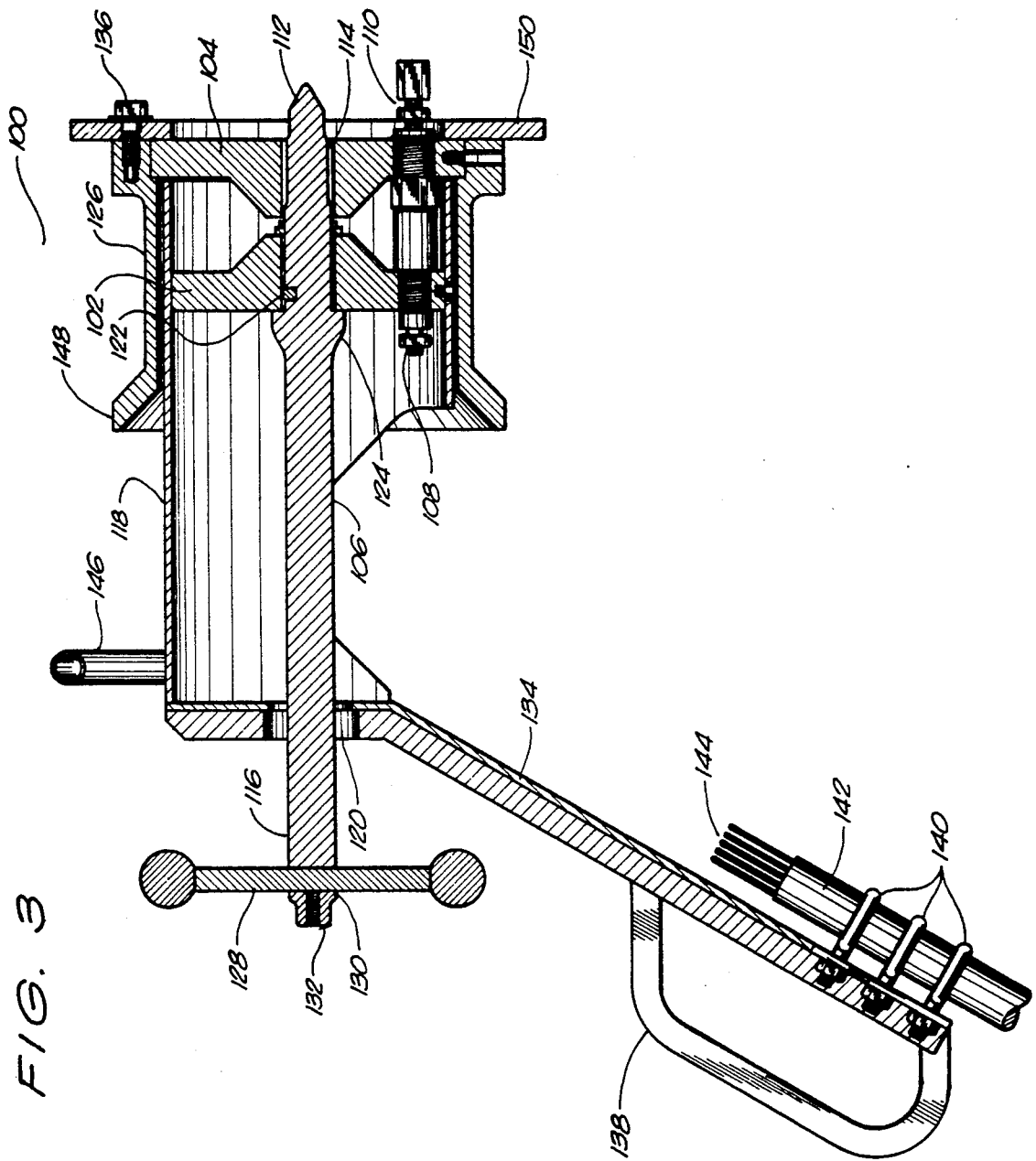
FIG. 3 is a cross-sectional view of the junction plates as assembled in the present invention.

In FIG. 3, there is shown at 100, the junction plate assembly in accordance with the preferred embodiment of the present invention. Junction plate assembly 100 includes a first junction plate 102 and a second junction plate 104. A connector 106 extends through the first junction plate 102 and engages the second junction plate 104 so as to secure the junction plates 102 and 104 together. The first junction plate 102 has a plurality of control connections 108 extending therethrough. Similarly, the second junction plate 104 has a plurality of control connections 110 extending therethrough. When the connector 106 joins plates 102 and 104 together, the connections 108 will be in fluid communication with or in electrical contact with the connections 110. The control connections 106 and 108 may be either hydraulic or electrical connections.

The connector 106 is a shaft which extends through the first junction plate 102. The shaft 106 has end 112 extending into the receptacle 114 of the second junction plate 104. Shaft 106 has another end 116 which extends outwardly from an opposite side of the first junction plate 102. Generally, the shaft 106 is a cylindrical member that extends longitudinally through housing 118 of the first junction plate 102. The shaft 106 extends through an opening 120 at one end of housing 118. Similarly, the shaft 106 extends through an opening and is supported by a bearing 122 within the first junction plate 102. The shaft 106 has a flared area 124 which has a surface abutting a surface of the first junction plate 102. Flared surface 124 engages a surface of the first junction plate 102 so as to draw the junction plate 102 into its proper connection with the second junction plate 104. The first junction plate 102 supports the shaft 106 in a position generally central of the housing 118. Housing 118 has a generally cylindrical configuration which is suitable for being received within the interior of frame 126 of the second junction plate 104.

Shaft 106 has a handle 128 fastened to the end 116. Handle 128 is a T-handle which is releasably slidably received by opening 130 extending through the diameter of shaft 106. A spring-loaded detent 132 is provided so as to secure handle 128 in the position shown in FIG. 3. The handle 128 is free to slide through opening 130, when pushed, so as to assume an eccentric position with respect to shaft 106. When the handle 128 is in its eccentric position, a greater amount of leverage can be provided to the shaft 106 during the installation of the junction plate assembly.

As will be described hereinafter, the end 112 of shaft 106 is a threaded member. Similarly, the receptacle 114 of the second junction plate 104 is correspondingly threaded. Therefore, as the shaft 106 is rotated, the flared surface 124 will interact with the threaded connections at the end 112 so as to draw the first junction plate 102 into close juxtaposition with the second junction plate 104.

The housing 118 of the first junction plate 102 has a first gripper member 134 connected thereto and extending outwardly therefrom. Gripper member 134 acts as a handle for the manipulation of the removable junction plate 102 with respect to the fixed junction plate 104 of the subsea structure. As was described previously the second junction plate 104 includes suitable means 136 for joining to a subsea structure. The first gripper member 134 extends downwardly and angularly outwardly from the end of the handle 118. A gripper handle 138 is provided at an end of the gripper member 134. The gripper handle 138 is suitable for manipulation by a diver during the installation of the present invention. Additionally, a plurality of clamps 140 are provided at the end of gripper member 134 so as to secure the umbilical cable 142 therein. The umbilical cable 142 has control lines 144 extending outwardly therefrom. The control lines 144 will connect to the control connections 108 of the first junction plate 102. As shown in FIG. 3, for the convenience of illustration, the lines 144 are not extended in their entirety.

A second gripper member 146 is fastened to the top side of the handle 118. The second gripper member 146 further assists in the manipulation of the first junction plate with respect to the second junction plate. Additionally, the second gripper member 146 can be connected to a buoyant apparatus so as to facilitate the movement of the removable junction plate within the water.

The second junction plate 114 is affixed within the frame 126. Frame 126 is also a cylindrical member which has a diameter greater than the diameter of housing 118. In essence, the frame 126 acts as a receptacle for the housing 118 and the first junction plate 102. A funnel edge 148 is provided at the end of frame 126 to further assist in enabling the diver to properly place the housing 118 within frame 126. The funnel edge 148 simply acts as a guide during installation. After installation, the funnel edge 148 will extend around the periphery of the housing 118. The second junction plate 114 includes a surface 150 which is suitable for being joined to the subsea structure. The control connections 110 can extend, as required, so as to be connected to the controls within the subsea structure.

FIG. 4 is an isolated view showing the arrangement of the removable junction plate 160 of the present invention. As was described previously, the removable junction plate 160 includes a first junction plate 162 which is mounted within housing 164. A plurality of control connections 166 extend through the junction plate 162 so as to be in a proper position for joining with the control connections of the second junction plate. The connector 168 extends centrally through the interior of the housing 164 and through the center of the first junction plate 162. Flared area 170 abuts the surface 172 of the first junction plate 162. As was described previously, the connector 168 has the handle 174 at one end so as to facilitate the rotational movement of the connector 168. The control connection 166 includes a suitable connection for joining with a corresponding control connection of the second junction plate. Housing 164 also includes the first gripper member 176 and the second gripper member 178, as was described previously.

Importantly, FIG. 4 illustrates the use of acme threads 180 on end 182 of the connector 168. Acme threads 180 are a special type of square thread. Acme threads have a generally wide flat surface. The acme threads, in the preferred embodiment of the present invention, are made of Nitronic 60 or Nitronic 50. Because of the configuration of the acme threads 180. Such threads are less subject to galling during the installation procedures. It is very hard to damage these strong wide threads. Additionally, the configuration of these external acme threads 180 makes for easier engagement with corresponding internal acme threads on the fixed junction plate. The acme threads 180 are formed on the end of the connector 168 extending outwardly from the junction plate 162.

The junction plate 162 has a widened boss in the area of the support for the connector 168. The thickness of the junction plate 162 is greater adjacent the connector 168. This adds support to the connector 168 and serves to minimize deflection between the plates.

FIG. 5 shows an end view of the removable junction plate 160. Of particular interest in FIG. 5, it can be seen that the housing 164 has a generally cylindrical configuration. A plurality of connector connections 166 extend through the junction plate 162. The number of connector connections 166 will be dependent upon the specific nature of the subsea structure to which it is connected. Commonly, twelve hydraulic connections are used on such junction plates. Electrical couplers can be added or subtracted as required. The connector 168 extends centrally of the cylindrical configuration 164.

In FIG. 5, it can be seen that a pair of keys 184 are affixed to opposite sides of the housing 164. These keys 184 have a generally rectangular configuration. Keys 184 conventionally will extend along for at least a portion of the length of housing 164. The keys 184 are specially designed so as to be received by the keyways formed on the interior of the frame of the fixed junction plate. Keys 184 serve to assure that the removable junction plate is properly joined to the fixed junction plate on the subsea structure. Additionally, the keys 184 assure proper alignment between the hydraulic and/or electrical connections of the junction plate 162 and those of the fixed junction plate.

Figure 7:
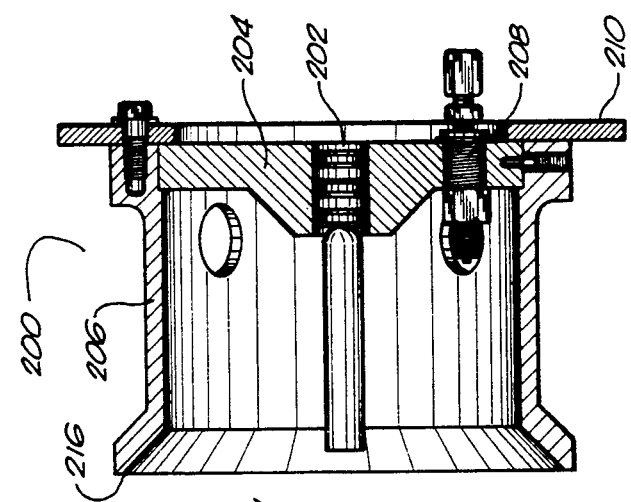
FIG. 7 is a cross-sectional view, in side elevation, of the fixed junction plate of the present invention.

FIG. 7 illustrates a cross-sectional view of the fixed junction plate 200. Fixed junction plate 200 includes a threaded receptacle 202 formed centrally of the second junction plate 204. Second junction plate 204 is affixed within frame 206. Hydraulic and/or electrical connections 208 extend through the second junction plate 204 so as to be exposed in a proper position for adjoining with the hydraulic and/or electrical connections of the first junction plate. A surface 210 is provided so as to join the fixed junction plate 200 to a subsea structure.

The second junction plate 202 has a widened area adjacent to the threaded receptacle 202. This widened boss area provides greater support for the receipt of the connector on the first junction plate. This serves to resist deflection and adds to the integrity of the connection.

Frame 206 is a generally cylindrical frame which includes a funnel edge 212. The funnel edge 212 serves as a guide for the exterior surface of the housing of the removable junction plate 160. To facilitate the installation, the keyway 214 is provided. Keyway 214 extends adjacent to the end 216 of the frame 206 to the threaded receptacle 202.

Figure 8:
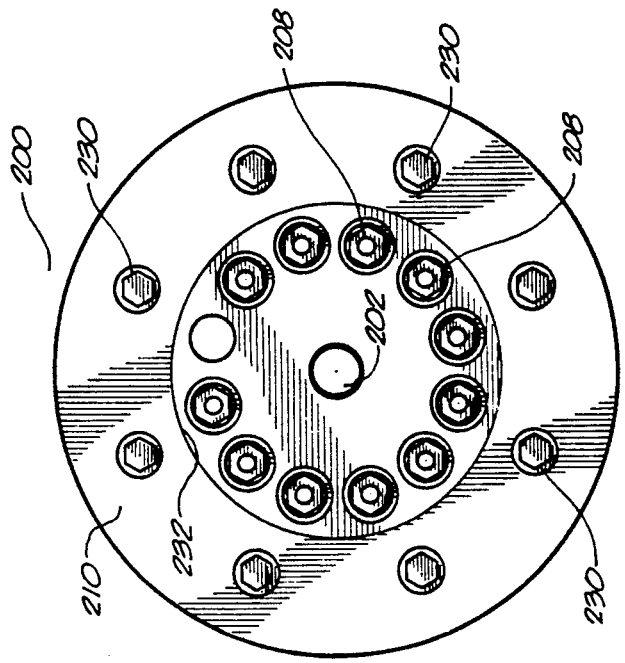
FIG. 8 is a right side view of the fixed junction plate, as shown in FIG. 7.
Figure 6:
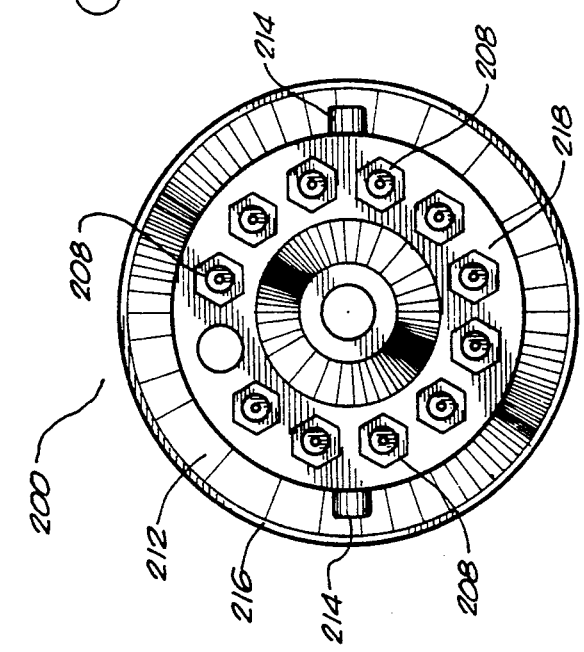
FIG. 6 is a left side end view of the fixed junction plate of the present invention.

Importantly, the threaded receptacle 202 includes internal acme threads. The internal acme threads of threaded receptacle 202 are suitable for threaded engagement with the external threads 180 on the removable junction plate 160. As can be seen in FIG. 7, the keyway 214 serves as a proper guide for enabling the external threads 180 on the removable junction plate 160 to be properly joined to the internal threads 202 on the fixed junction plate 200. As used herein, the fixed junction plate 200, as illustrated in FIGS. 6–8, corresponds in use and appearance to the second junction plate 104 in combination with the frame 126 of FIG. 3. The second junction plate 204 of FIGS. 6–8 corresponds in use and appearance to the second junction plate 104 of FIG. 3. Similarly, the first junction plate 162 of FIGS. 4 and 5 corresponds in use and appearance to the first junction plate 102 of FIG. 3. The removable junction plate 160 of FIGS. 4 and 5 corresponds to the configuration of the first junction plate 102 in combination with the shaft 106 and housing 118 of FIG. 3.

FIG. 6 is a left side end view of the fixed junction plate 200 of FIG. 7. Initially, it can be seen that the funnel edge 212 extends from end 216 inwardly. The keyways 214 are formed on opposite sides of the cylindrical interior 218. The keyways 214 serve to matingly receive the keys 184 of the removable junction plate 160. It can be seen that a plurality of hydraulic and/or electrical connections 208 open within the fixed junction plate 200. Threaded receptacle 202 is positioned centrally of the fixed junction plate 200.

FIG. 8 is a right side end view of the fixed junction plate 200. A number of holes 230 extend around the plate 210. Holes 230 are suitable for joining the frame 206 to the plate 210. They may also be used to properly attach the fixed junction plate 200 to the subsea tree structure. An opening 232 is formed on the interior of plate 210 so as to allow for the hydraulic and/or electrical connections 208 to extend outwardly therefrom. The threaded receptacle 202 is shown as centrally positioned within the fixed junction plate 200.

Figure 9:
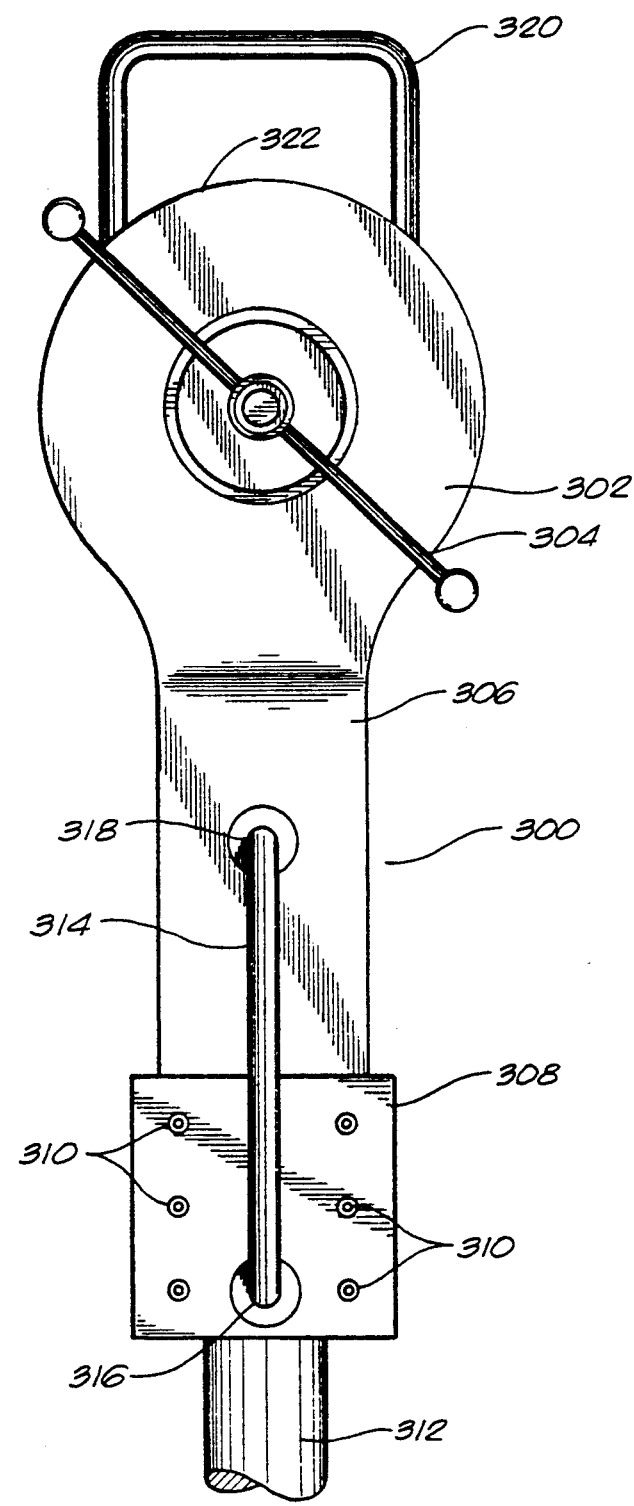
FIG. 9 is an end view of the diver-assist removable junction plate showing, in particular, the configurations of the handles and grip members.

FIG. 9 illustrates the configuration of the gripper member 300 as used with the removable junction plate. The gripper member 300 has an upper body portion 302 which can be joined to the housing of the removable junction plate. The handle 304 extends through the upper body portion 302 so that it can be properly manipulated. A central body portion 306 extends downwardly from the upper body portion 302. A base plate 308 is affixed to the body portion 306. Base plate 308 includes a plurality of fasteners 310 that are used so as to secure the clamps around the umbilical cable 312. The umbilical cable 312 extends upwardly to the gripper member 300.

A gripper handle 314 has one end 316 fastened to the base plate 308 and another end 318 fastened to the body portion 306. It has been found that the positioning of the handle in this matter assists the diver in the proper manipulation of the removable junction plate. A second gripper handle 320 is provided on the top surface 322 of the upper body portion 302. Handle 320 has a generally U-shaped configuration. The diver may grasp handle 314 and handle 320 so as to properly manipulate the removable junction plate for the purpose of installation. Alternatively, various buoyancy devices could be connected to the upper handle 320 so as to assist in the guiding of the removable junction plate. The rotatable handle 304 can be turned, in one direction or another, so as to cause the external acme threads on the connector to engage the internal acme threads. Continued rotation may be accomplished by applying a proper force to the handle 304 until the removable junction plate is properly secured to the fixed junction plate.

As was described previously, the removable junction plate is contained within the flange barrel of the weak link assembly 10. Alternatively, a protective covering can also be used. The flange barrel includes a threaded receptacle that can be used to receive the threaded end of the shaft. By installing the removable junction plate within the flange barrel or within a protective cover, particulate contamination is prevented from fouling the hydraulic connections.

Initially, the diver must travel to the weak link assembly at the bottom of the body of water. The diver initially will rotate the handle on the removable junction plate so as to remove the junction plate from the flange barrel on the weak link assembly. The diver will grasp the gripper handles and remove the junction plate from the weak link assembly.

The diver will then move the removable junction plate from the weak link assembly to an area generally adjacent the opening of the frame of the fixed junction plate. The diver will manipulate the housing of the removable junction plate by using the gripper handles, as needed. The housing is then inserted within the interior of the frame so that the end of the connector will "stab" into the receptacle of the fixed junction plate. After this stabbing has occurred, the diver may move one of his hands from the gripper member. The diver will then rotate the handle so that the first junction plate is brought into proximity to the second junction plate. Since the keys on the housing have been aligned with the keyways on the frame, the positioning of the hydraulic and/or electrical connections will be accurate. Therefore, the diver can continue to rotate the handle until the connections are properly joined. After the connections have been properly joined together, the removable junction plate is properly installed on the subsea tree structure.

Figure 10:
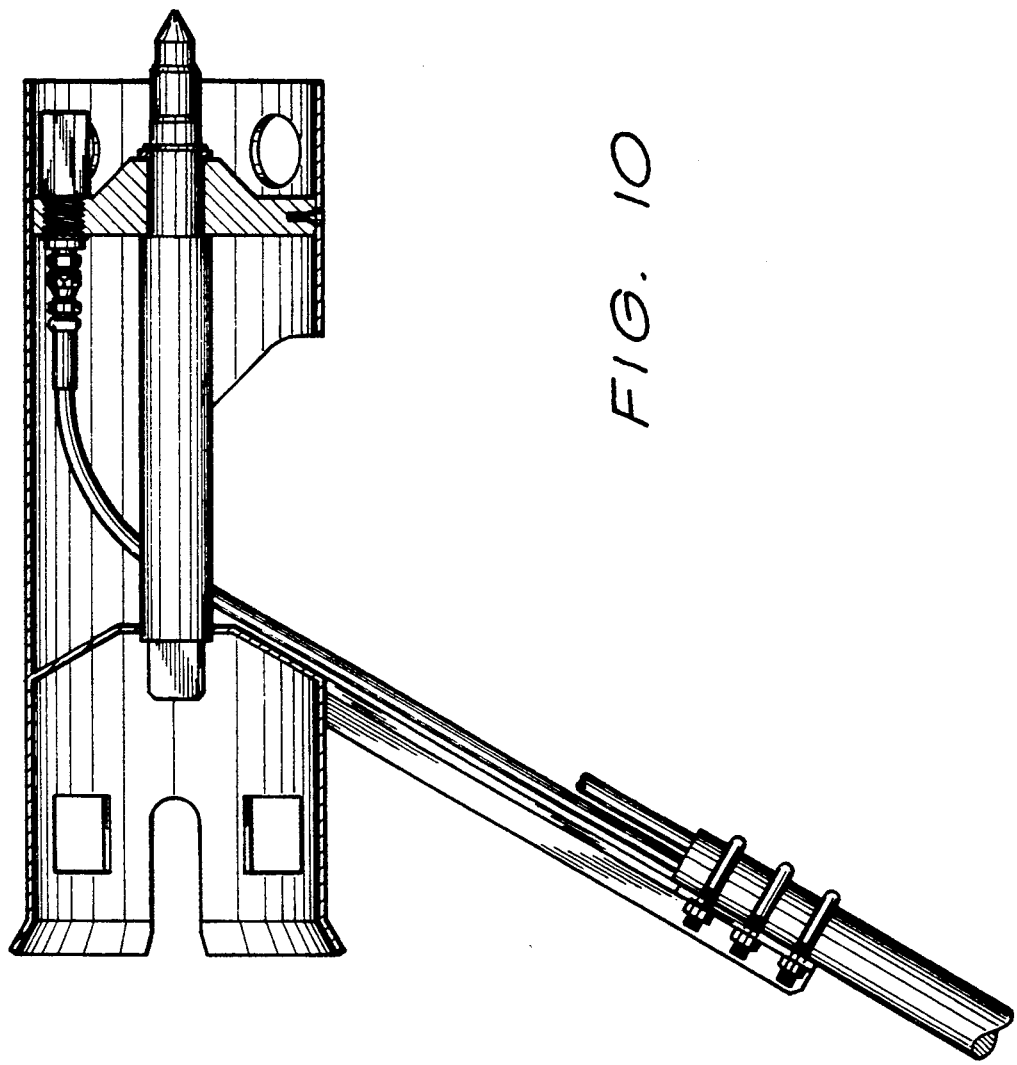
FIG. 10 is a cross-sectional view of an alternative configuration of the removable junction plate of the present invention as used for ROV installation.

The present invention can also be utilized with a diverless operation. FIG. 10 shows an embodiment of the removable junction plate of the present invention which is useful when installed in a diverless manner. In a diverless operation, a remotely operated vehicle (ROV) can be utilized to manipulate the removable junction plate of FIG. 10 for joining to the fixed junction plate. The ROV can be equipped with a torque tool which can latch onto a receptacle funnel. The removable junction plate can be guided into the receptacle. Once the alignment and orientation is obtained, the torque tool will rotate to engage the lock downbolt mating the removable and the fixed junction plates. The torque tool locking dogs are disengaged from the receptacle; thereby, unlocking the torque tool from the removable junction plate and the ROV will retrieve the torque tool to the surface.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A junction plate asembly for a subsea structure comprising:

a first junction plate having a first plurality of control connections contained therein, said first junction plate having an umbilical cable connected to said first plurality of control connections;

a second junction plate having a second plurality of control connections contained therein, said second junction plate having means thereon for affixing to the subsea structure; and a connector connected to and extending generally centrally of said first junction plate, said connector engaging a receptacle of said second junction plate, said connector joining said first plurality of control connections is in communication with said second plurality of control connections, said connector comprising a shaft extending through said first junction plate, said shaft having one end extending into said receptacle of said second junctin plate, said shaft having another end extending outwardly of said first junction plate, said shaft in a threaded engagement with said receptacle.

2. The assembly of claim 1, one end of said shaft having an external acme thread formed thereon, said receptacle having an internal acme thread, said external acme thread of said shaft in said threaded engagement with said internal acme thread of said receptacle.

3. The assembly of claim 1, said another end of said shaft having a handle connected thereto, said handle rotatable for rotating said shaft.

4. The assembly of claim 3, said handle releasably slidably received by said shaft, said handle movable so as to eccentrically connect to said shaft.

5. The assembly of claim 1, said first junction plate comprising:

a housing having a generally cylindrical configuration, said connector extending longitudinally within said housing; and a first gripper member connected to said housing.

6. The assembly of claim 5, further comprising:

a second gripper member connected to a side of said housing opposite said first gripper member.

7. The assembly of claim 5, said second junction plate comprising:

a frame defining an opening, said frame having a generally cylindrical configuration, said opening receiving said housing of said first junction plate therein.

8. The assembly of claim 7, said frame having a funnel edge extending outwardly from said opening, said funnel edge extending around said housing of said first junction plate.

9. The assembly of claim 1, further comprising:

a weak link assembly connected to said umbilical cable opposite said first junction plate, said weak link assembly connected to said umbilical cable and to a control unit.

10. The assembly of claim 9, said weak link assembly having a flange barrel formed thereon, said flange barrel having a second receptacle suitable for receiving said connector.

11. A junction plate assembly for a subsea structure comprising:

a first junction plate having a first plurality of control connections contained therein, said first junction plate having an umbilical cable connected to said first plurality of control connections, said first junction plate comprising:

a housing having a generally cylindrical configuration; and a first gripper member connected to said housing;

a second junction plate having a second plurality of control connections contained therein, said second junction plate having means thereon for affixing to the subsea structure, said second junction plate comprising a frame defining an opening, said frame having a generally cylindrical configuration, said opening receiving said housing of said first junction plate therein, said housing in sliding engagement with said frame, said sliding engagement defined by a key in sliding engagement with a key way, said key and said key way arranged on surfaces of said housing and said frame; and a connector connected to and extending generally centrally of said first junction plate, said connector engaging a receptacle of said second junction plate, said connector joining said first junction plate to said second junction plate such that said first plurality of control connections is in communication with said second plurality of control connections, said connector extending longitudinally within said housing of said first junction plate.

12. A removable junction plate for connection to a subsea structure comprising:

a plate member having a plurality of control connections extending therethrough;

a housing receiving said plate member therein;

an umbilical cable having control lines extending therethrough, said control lines interconnected to said plurality of control connections on said plate member; and a connector extending through an interior of said housing, said connector supported by said plate member, said connector having an end extending through said plate member, said end for engaging the subsea structure, said connector rotatably received by said plate member, said connector extending centrally through said plate member, said connector having a handle affixed to an opposite end thereof, said handle positioned exterior of said housing, said handle for imparting rotational movement to said connector.

13. The junction plate of claim 12, said end of said connector having external acme threads formed thereon.

14. The junction plate of claim 12, said housing having a generally cylindrical configuration, said housing having a key affixed to an exterior surface of said housing.

15. The junction plate of claim 12 further comprising:

a first gripper member connected to said housing, said first gripper member having a clamp affixed thereto, said clamp connecting said umbilical cable to said first gripper member.

16. The junction plate of claim 12, further comprising:

a weak link assembly connected to an end of said umbilical cable opposite said plate member, said weak link assembly connected to said control lines of said umbilical cable and to a controller unit.

17. The junction plate of claim 16, said weak link assembly having a flange barrel formed therein, said flange barrel having a receptacle therein, said receptacle detachably connected to said end of said connector.

* * * * *